Patented Mar. 13, 1934

1,950,883

UNITED STATES PATENT OFFICE 1,950,883

TREATMENT OF ALUMINUM HYDRATE

Walter H. Gitzen, East St. Louis, Ill., assignor to Aluminum Company of America, Pittsburgh, Pa., a corporation of Pennsylvania No Drawing. Application May 31, 1932, Serial No. 614,646

5 Claims. (Cl. 23—141)

This invention relates to the production of purified alumina substantially free from soda, and it is particularly concerned with a method for the treatment of aluminum hydrate containing a small but substantial amount of soda as an impurity, to produce therefrom alumina substantially free from soda.

Purified alumina, particularly in the form of corundum, has been found to be eminently suitable for use in the manufacture of certain types of refractory and ceramic materials. However, the alumina of commerce, such as is prepared from aluminous ores, while relatively pure, usually contains a substantial amount of soda. The presence of this soda is the result of the precipitation of the aluminum hydrate from solutions of alumina in soda and it has heretofore been found impossible to remove all, or substantially all, of the soda occluded by the precipitated aluminum hydrate. The presence of these small but substantial amounts of soda in the alumina has a deleterious effect on the refractory materials prepared from it, and the application of alumina in this field has been seriously restricted for this reason.

It is an object of this invention to provide a method for the treatment of aluminum hydrate containing a small amount of soda as an impurity whereby alumina substantially free from soda may be prepared. It is another object of this invention to provide a method for the production of a corundum-like alumina substantially free from soda, from aluminum hydrate containing this material as an impurity.

In the commercial extraction of alumina from its ores, the Bayer process or the Fickes-Sherwin or other modification of this process has been used to the practical exclusion of all other processes for the past twelve years. In these processes the aluminous ore is digested with a hot solution of caustic soda in excess. A solution of sodium aluminate is formed which is separated from the insolubles, including impurities, by filtration. Aluminum hydrate is precipitated from the caustic solution by any suitable means, such as by neutralization with carbon dioxide or by cooling the saturated solution to the point of supersaturation and causing crystallization by means of seed charges of aluminum hydrate crystals. A considerable amount of caustic solution is occluded by the precipitated aluminum hydrate. In order to remove this occluded caustic, it is customary to subject the hydrate to a thorough washing with water. It has been found impossible, however, even with excessive washing and leaching, to remove all, or substantially all, of the soda contained in the aluminum hydrate precipitated in this manner. The washed product generally contains a residual amount of soda which, in commercial operation, varies between about 0.2 and 0.6 per cent by weight of the product. This soda remains as an impurity in the corundum-like alumina which is produced by calcining the washed hydrate at a temperature of about 1300° to 1400° centigrade, and attempts to remove it by leaching from this calcined product have also proved unsuccessful.

I have found that if aluminum trihydrate containing a small amount of soda, such as is obtained from the Bayer process, be first calcined at a temperature of about 400° to 925° centigrade and subsequently leached with a dilute acid solution, the soda may be substantially completely removed and a product obtained which contains less than about 0.01 per cent soda. This product may then be re-calcined at a temperature of 1300° to 1400° centigrade to produce alumina which is eminently satisfactory for use in the production of refractory and ceramic materials.

In carrying out my process, the aluminum hydrate obtained from the sodium aluminate solution, after preliminary washing to remove the bulk of the soda, is calcined in any suitable furnace at a temperature of 400° to 925° centigrade. There is thus obtained an amorphous alumina or a mixture of amorphous and crystalline alumina from which the residual soda may be substantially completely removed by leaching with dilute acid solution. Satisfactory results may be obtained by calcining the hydrate at any temperature within this range, but it is preferable to calcine at a temperature of about 800° to 900° centigrade, as the soda is more easily leached from a product heated at this temperature. The time of heating required varies with the temperature used, but, in general, the heating should be continued until a substantial conversion to the desired form of alumina has been effected, and for this purpose I have found a period of about 1 to 6 hours is usually required.

The calcined alumina thus obtained is leached with a solution of an acid, preferably a mineral acid such as hydrochloric or sulfuric acid. Any suitable amount of solution may be used which will form a slurry with the calcined hydrate satisfactory for handling. I have found that satisfactory slurries are obtained by using about 5 parts by weight of the leaching solution to 1 part of the calcined hydrate. The quantity of acid used in the leach liquor must be at least an amount equivalent to the soda content of the material being treated, and it may be several times such an amount. In my preferred practice I use about 2 to 3 times the amount of acid equivalent to the soda present in the alumina being treated. The soda content of the alumina may be preliminarily determined by analysis. The time of leaching is not critical but I have found that satisfactory results are generally obtained by treatment for one to two hours.

The leached product thus obtained usually contains less than 0.01 per cent soda. This product is then separated from the leach liquor, preferably by filtration, and is dried and re-calcined. This second calcination may be carried out at 1300° to 1400° centigrade and a corundum-like alumina produced which is substantially free from soda and which is eminently useful in the production of ceramic and refractory materials.

As a specific example of my process and the results which may be obtained thereby, a simple of aluminum hydrate containing about 0.6 per cent $Na_2O$ calculated on the basis of the alumina content of the hydrate was calcined at a temperature of about 900° centigrade. The calcined product was then leached for about one hour in five times its weight of a solution of hydrochloric acid containing an amount of HCl equivalent to about 1.9 per cent of the alumina treated, or somewhat more than twice the amount of HCl required to combine stoichiometrically with all of the soda present in the alumina. The product was separated, washed and recalcined. Analysis showed this product to contain about 0.003 per cent $Na_2O$ and about 98.3 per cent $Al_2O_3$.

Having now particularly described my process and the results which may be obtained in the practice thereof, what I claim is:

1. A method of producing alumina substantially free from soda from aluminum hydrate containing a small amount of soda as an impurity, which comprises calcining said hydrate at a temperature between 400 and 925° centigrade and subsequently leaching the calcined product with a solution of an acid.

2. A method of producing alumina substantially free from soda from aluminum hydrate containing a small amount of soda as an impurity, which comprises calcining said hydrate at a temperature of about 800 to 900° centigrade and subsequently leaching the calcined product with a solution of an acid.

3. A method of producing alumina substantially free from soda from aluminum hydrate containing a small amount of soda as an impurity, which comprises calcining said hydrate at a temperature between 400 and 925° centigrade and subsequently leaching the calcined product with a solution of an acid containing an amount of acid at least sufficient to combine with all the soda present in the hydrate.

4. A method of producing alumina substantially free from soda from aluminum hydrate containing a small amount of soda as an impurity, which comprises calcining said hydrate at a temperature of about 800 to 900° centigrade and subsequently leaching the calcined product with a solution of an acid containing an amount of acid at least sufficient to combine with all of the soda present in the hydrate.

5. A method of producing corundum substantially free from soda from aluminum hydrate containing a small amount of soda as an impurity, which comprises calcining said hydrate at a temperature between 400 and 925° centigrade, leaching the calcined product with a solution of an acid and calcining the leached product at a temperature of about 1300 to 1400° centigrade.

WALTER H. GITZEN.